(12) United States Patent
Chun et al.

(10) Patent No.: US 9,467,058 B2
(45) Date of Patent: Oct. 11, 2016

(54) METHOD AND APPARATUS FOR CONTROLLING OUTPUT VOLTAGE OF DC-DC CONVERTER

(71) Applicant: Hyundai Motor Company, Seoul (KR)

(72) Inventors: Shin Hye Chun, Jeollanam-do (KR);
Mu Shin Kwak, Gyeonggi-do (KR);
Hyun Wook Seong, Gyeonggi-do (KR);
Hui Sung Jang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 138 days.

(21) Appl. No.: 14/505,904

(22) Filed: Oct. 3, 2014

(65) Prior Publication Data

US 2015/0333624 A1    Nov. 19, 2015

(30) Foreign Application Priority Data

May 16, 2014    (KR) ........................ 10-2014-0059274

(51) Int. Cl.
*G05F 1/00* (2006.01)
*H02M 3/335* (2006.01)
*H02M 3/156* (2006.01)
*H02M 1/00* (2006.01)

(52) U.S. Cl.
CPC ......... *H02M 3/33569* (2013.01); *H02M 3/156* (2013.01); *H02M 2001/007* (2013.01); *H02M 2001/0009* (2013.01)

(58) Field of Classification Search
CPC ........... H02M 3/156; H02M 3/33569; H02M 2001/007; H02M 2001/0009
USPC ........ 323/207, 299, 300, 282, 283, 285, 222
See application file for complete search history.

(56) References Cited

U.S. PATENT DOCUMENTS

| 7,855,539 B1* | 12/2010 | Wong ...................... H02M 1/32 323/283 |
| 8,089,782 B2* | 1/2012 | Wei ....................... H02M 3/156 323/283 |
| 9,030,178 B2* | 5/2015 | Chang .................... H02M 1/36 323/276 |
| 2009/0230899 A1* | 9/2009 | Arimura ............. H02M 3/1582 318/400.01 |
| 2012/0057382 A1* | 3/2012 | Uno ..................... H02M 1/4225 363/89 |
| 2013/0054041 A1 | 2/2013 | Fishelov et al. |
| 2014/0009080 A1* | 1/2014 | Xu ..................... H05B 33/0815 315/224 |

FOREIGN PATENT DOCUMENTS

| JP | H06233530 A | 8/1994 |
| JP | H08214543 A | 8/1996 |
| KR | 10-2005-0070025 | 7/2005 |
| KR | 10-2005-0071689 A | 7/2005 |
| KR | 10-2007-0058913 A | 6/2007 |
| WO | 2011/048796 A1 | 4/2011 |

* cited by examiner

*Primary Examiner* — Jeffery Gblende
*Assistant Examiner* — Alex Torres-Rivera
(74) *Attorney, Agent, or Firm* — Mintz Levin Cohn Ferris Glovsky and Popeo, P.C.; Peter F. Corless

(57) ABSTRACT

An output voltage control method and apparatus are provided. The method includes sensing output voltages of a DC-DC converter and a high-voltage battery and sensing an inductor current flowing through an inductor in a boost circuit at a front end of the DC-DC converter. In addition, the method includes varying a gain of an output voltage controller of the DC-DC converter based on a difference of the sensed inductor current with respect to an inductor current at the center point in a specified region.

9 Claims, 4 Drawing Sheets

METHOD AND APPARATUS FOR CONTROLLING OUTPUT VOLTAGE OF DC-DC CONVERTER

CROSS REFERENCE TO RELATED APPLICATION

The present application claims priority to Korean Patent Application No. 10-2014-0059274, filed on May 16, 2014, the entire contents of which is incorporated herein for all purposes by this reference.

BACKGROUND

1. Field of the Invention

The present invention relates, in general, to a method and apparatus for controlling an output voltage and, more particularly, to a method and apparatus for controlling an output voltage by varying a gain of an output voltage controller based on the current-continuity of an inductor in a boost circuit of a direct current-direct current (DC-DC) converter.

2. Description of the Related Art

Generally, a DC-DC converter used in an eco-friendly vehicle has a different control band according to a change in conditions of a high-voltage battery and electronic loads. When the control band is decreased, noise control is substantially high, but the responsiveness is deteriorated, resulting in degradation of the control performance in a transient state. Therefore, a DC-DC converter requires the same control band that extends over the whole operation region without the degradation of responsiveness even when conditions of a high-voltage battery and electronic loads change. The DC-DC converter may consist of a boost circuit having variable activity level and a full bridge circuit having a fixed activity level. An input terminal of the DC-DC converter is connected to the high-voltage battery; and an output terminal of the DC-DC converter is connected to a low-voltage battery and various other electronic loads.

In order to have the same control band inclusive of the whole operation region, an inductor in a boost circuit requires substantially high inductance. When the inductance is sufficiently high, the discontinuity of the current flowing through the inductor of the boost circuit which performs variable activity control may be reduced. However, a problem exists in hardware which cannot sufficiently increase the inductance of the inductor.

The foregoing is intended merely to aid in the understanding of the background of the present invention, and is not intended to mean that the present invention falls within the purview of the related art that is already known to those skilled in the art.

SUMMARY

Accordingly, the present invention provides an output voltage control method and apparatus that varies a gain of a Proportional Integral controller (PI controller) to maintain the control responsiveness even under inductor current-discontinuous mode, thereby improving the responsiveness of an output voltage.

In order to achieve the above object, according to one aspect, the present invention provides an output voltage control method that may include: sensing output voltages of a DC-DC converter and a high-voltage battery; sensing an inductor current flowing through an inductor in a boost circuit at a front end of the DC-DC converter; and varying a gain of an output voltage controller of the DC-DC converter based on a difference of the sensed inductor current with respect to an inductor current at the center point in a specified region.

An output side of the DC-DC converter may be connected to a load terminal, and the stage of sensing the inductor current may include sensing the inductor current that is variable as the load terminal varies. The inductor current at the center point may be calculated based on the sensed output voltage of the high-voltage battery and inductance of the inductor. The specified region may be an active or a dormant region. The stage of varying the gain may include increasing the gain in proportion to a difference between the inductor current at the center point and the sensed inductor current. In addition, the stage of varying the gain may include varying the gain according to a preset map based on a difference between the inductor current at the center point and the sensed inductor current. The stage of varying the gain may include determining the discontinuity of the inductor current based on a difference between the inductor current at the center point and the sensed inductor current. When the inductor current is determined to be discontinuous, a stage may be carried out to vary the gain of the output voltage controller of the DC-DC converter. A further stage may be carried out to determine the continuity of the inductor current as the gain is varied, and when the inductor current is determined to be continuous, to interrupt the varying of the gain.

According to another aspect, the present invention provides an output voltage control apparatus that may include: a plurality of first sensors configured to sense output voltages of a DC-DC converter and a high-voltage battery; a boost circuit disposed at a front end of the DC-DC converter to boost an input voltage of the DC-DC converter; a second sensor configured to sense an inductor current flowing through an inductor in the boost circuit; and an output voltage controller of the DC-DC converter configured to vary a gain based on a difference of the sensed inductor current with respect to an inductor current at the center point in a specified region.

According to the present invention, the method and apparatus may improve a phenomenon in which the inductor current flowing through the inductor in the boost circuit becomes discontinuous, thereby improving the responsiveness of the output voltage. Further, according to the present invention, even when the use of electronic loads is substantially low; a low-voltage battery may be fully charged with electricity or an output voltage of a DC-DC converter may be similar to a charged voltage of a high-voltage battery; and a substantially high load, such as hitting the brake, may be used intermittently, the control performance on an output voltage may be maintained, thereby providing a stable power source of a vehicle.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION

Figure 1:
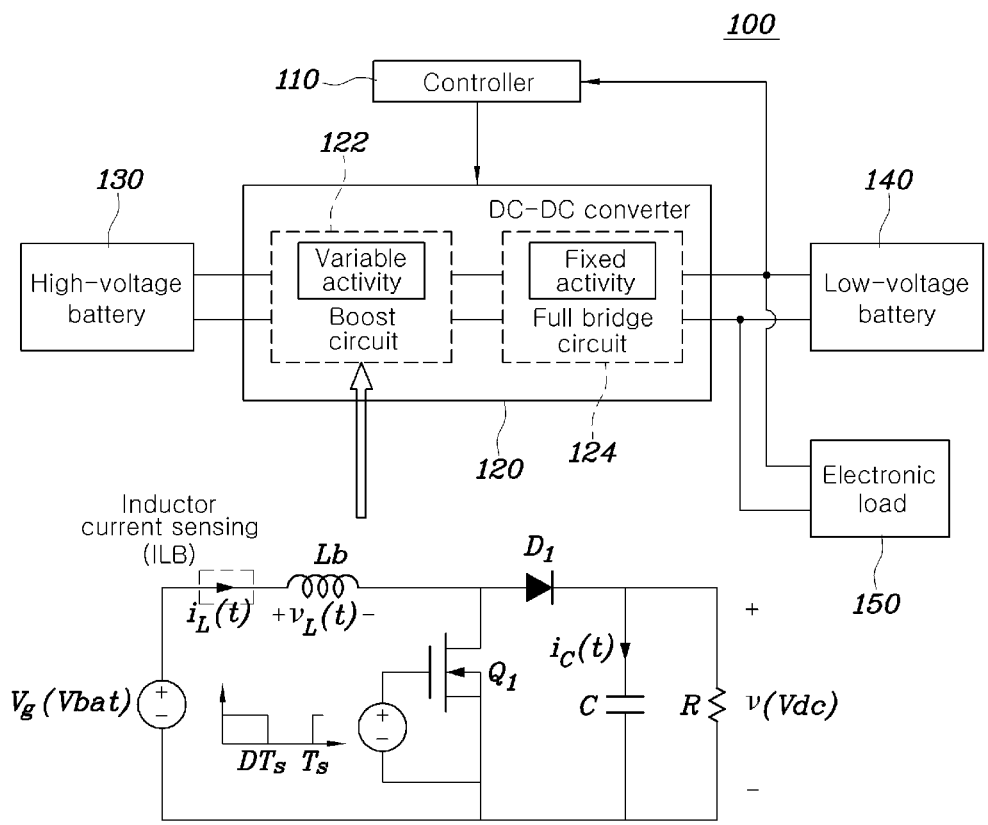
FIG. 1 is an exemplary block diagram showing an output voltage control system including an output voltage control apparatus according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Specific structural and functional descriptions of exemplary embodiments of the present invention disclosed herein are only for illustrative purposes of the exemplary embodiments of the present invention. The present invention may be embodied in many different forms without departing from the spirit and significant characteristics of the present invention. Therefore, the exemplary embodiments of the present invention are disclosed only for illustrative purposes and should not be construed as limiting the present invention.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to various exemplary embodiments of the present invention, specific examples of which are illustrated in the accompanying drawings and described below, since the exemplary embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, exemplary embodiments of the present invention will be described in detail with reference to the accompanying drawings. Throughout the drawings, the same reference numerals will refer to the same or like parts.

FIG. 1 is an exemplary block diagram showing an output voltage control system including an output voltage control apparatus according to an exemplary embodiment of the present invention. Referring to FIG. 1, an output voltage control system 100 may include a controller 110, a DC-DC converter 120, a high-voltage battery 130, a low-voltage battery 140, and an electronic load 150. The DC-DC converter 120 may include a front boost circuit 122 and a rear full bridge circuit 124.

An output voltage control apparatus may include a plurality of first sensors or voltage sensors (not shown) configured to sense output voltages of the DC-DC converter 120 and the high-voltage battery 130, the DC-DC converter 120, a second sensor (not shown) or current sensor configured to sense an inductor current flowing through an inductor in the boost circuit 122 of the DC-DC converter 120, an output voltage controller (310 in FIG. 3) configured to vary (e.g., adjust) an output voltage gain of the DC-DC converter 120, and a current controller (320 in FIG. 3) configured to receive the sensed inductor current of the boost circuit 122 to output an activity value. The boost circuit 122 may be controlled in a variable-activity manner, but the full bridge circuit 124 may be controlled in a fixed-activity manner. The DC-DC converter 120 may be connected with the high-voltage battery 130 at an input side thereof, and with the low-voltage battery 140 and the electronic load 150 at an output side thereof.

Figure 2:
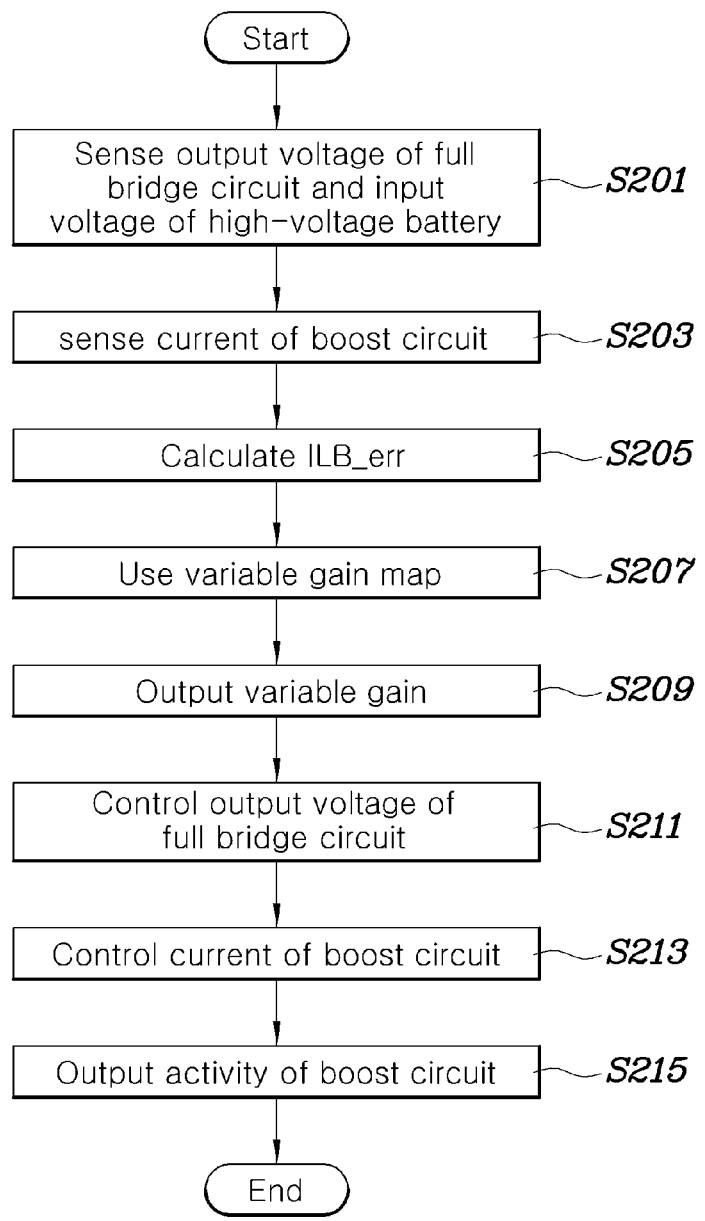
FIG. 2 is an exemplary flow chart showing an output voltage control method according to an exemplary embodiment of the present invention.
Figure 3:
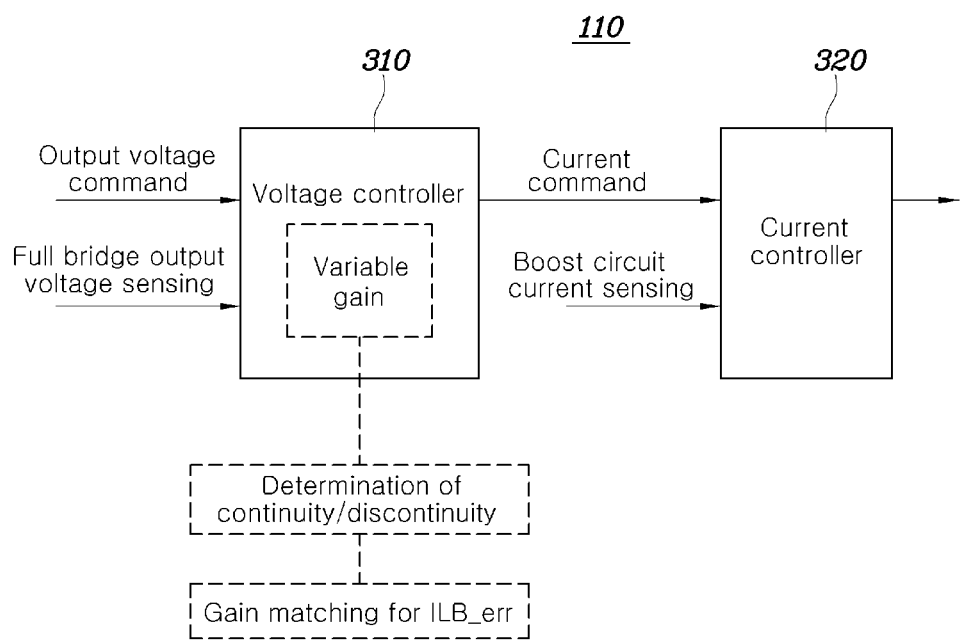
FIG. 3 is an exemplary block diagram showing a voltage controller and a current controller provided in a controller according to an exemplary embodiment of the present invention.
Figure 4:
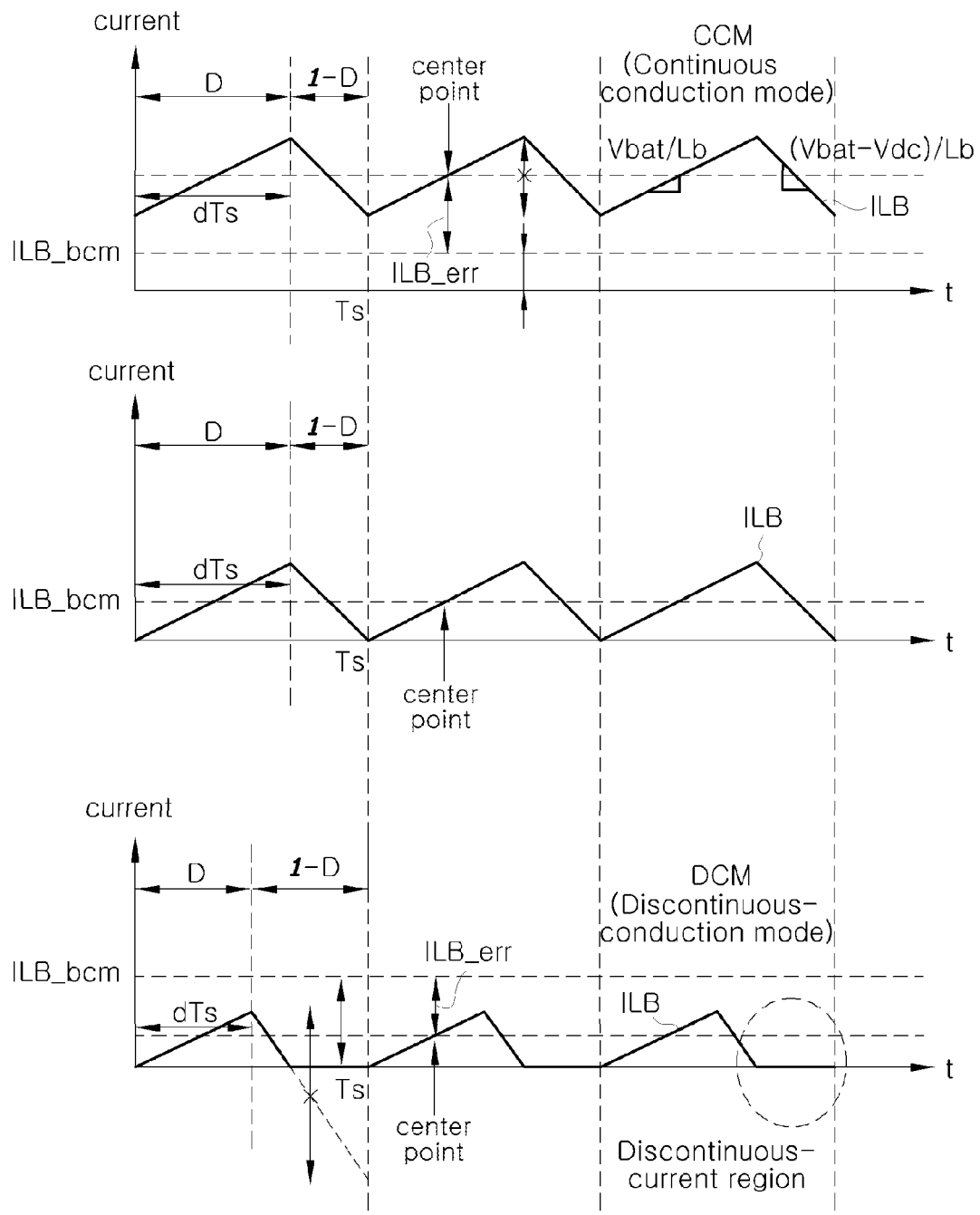
FIG. 4 is an exemplary graph showing sensed values of an inductor current along with the flow of time for each current mode according to an exemplary embodiment of the present invention.

FIG. 2 is an exemplary flow chart showing an output voltage control method according to an exemplary embodiment of the present invention, FIG. 3 is an exemplary block diagram showing a voltage controller and a current controller provided in a controller 110 according to an exemplary embodiment of the present invention, and FIG. 4 is an exemplary graph showing sensed values of an inductor current along with the flow of time for each current mode.

Referring to FIGS. 1 to 4, an output voltage control method may include: a stage (S201) of sensing, by a plurality of voltage sensors, output voltages of the DC-DC converter 120 and the high-voltage battery 130; a stage (S203) of sensing, by a current sensor, an inductor current (ILB) flowing through an inductor (L) in the boost circuit 122 at a front end of the DC-DC converter 120; and stages of calculating, by a controller, a difference of the sensed inductor current (ILB) with respect to an inductor current at a center point in a specified region (S205), and varying, by the controller, a gain of the output voltage controller (310 in FIG. 3) of the DC-DC converter 120 based on a preset map according to the difference (S207); thereby controlling an output voltage of the DC-DC converter 120 (S209 and S211). Thereafter, the inductor current may be controlled or adjusted according to a current command of the voltage controller 310 (S213), and the current controller 320 may be configured to output an activity value of the boost circuit 122 (S215). The output side of the DC-DC converter 120 may be connected to the low-voltage battery 140 and a load terminal such as the electronic load 150, and an inductor current, which may vary according to a change in load of the load terminal and a charged state of the battery, is sensed.

As shown in FIG. 4, the specified region may be an active region (D) or a dormant region (1-D). A difference (ILB_err) of the sensed inductor current (ILB) with respect to an inductor current (ILB_bcm) at the center point in the active region (D) or the dormant region (1-D) may be calculated. Specifically, the inductor current at the center point may be the inductor current at the center point between the time when the inductor current is continuous and the time when the inductor current is discontinuous. The difference (ILB_err) is greater than 0 when the sensed inductor current (ILB) is greater than the inductor current (ILB_bcm) at the center point. In particular, the controller 110 may be configured to determine that the inductor current is continuous.

When the sensed inductor current (ILB) is about equal to the inductor current (ILB_bcm) at the center point, the difference (ILB_err) is equal to about 0. Further, when the sensed inductor current (ILB) is less than the inductor current (ILB_bcm) at the center point, the difference (ILB_err) is less than about 0. As the difference (ILB_err) increases negatively, an absolute value of the difference (ILB_err) increases. When the sensed inductor current (ILB) is less than the inductor current (ILB_bcm) at the center point, the difference (ILB_err) is less than about 0. In particular, the controller 110 may be configured to determine that the inductor current is discontinuous. When the inductor current is in a discontinuous conduction mode, the responsiveness may be reduced compared to when the inductor current is in a continuous conduction mode. Such a reduction in responsiveness may be compensated for by increasing the gain of the voltage controller 310 in proportion to the absolute value of the difference (ILB_err). The sensed inductor current means an average value of sensed inductor currents.

The inductor current (ILB_bcm) at the center point may be calculated based on the sensed output voltage (Vbat) of the high-voltage battery, the inductance of the inductor (L), and a voltage of a boost terminal. Specifically, the inductor current (ILB_bcm) may be calculated according to Equation 1 as follows.

$$ILB\_bcm = (Vdc - Vbat)/Lb * (1-d)Ts * (1/2) \qquad \text{Equation 1}$$

wherein, Vbat is a voltage of the high-voltage battery, Vdc is a voltage of a boost terminal, d is activity, Ts is a switching cycle, and Lb is the inductance of the inductor at a boost terminal.

The discontinuity of the inductor current may be determined according to the difference between the inductor current at the center point and the sensed inductor current. When the inductor current is determined to be discontinuous, the gain of the output voltage controller of the DC-DC converter may be varied. Further, when the inductor current switches again to the continuous mode from the discontinuous mode, the varying of the gain may be interrupted. When the gain is continuously increased even when updating on the discontinuous-continuous switching is delayed, overshoot may occur due to excessively large gain. Accordingly, varying of the gain may be interrupted when the current mode switches. In particular, varying the gain should be set such that overshoot or undershoot of an output voltage at a boundary between the discontinuity and continuity is prevented. Further, digital sampling and digital filtering of the gain should not be delayed. Accordingly, a sampling cycle, filtering-time constant or the like may be set.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of controlling an output voltage, comprising:
   sensing, by a plurality of voltage sensors, output voltages of a direct current-direct current (DC-DC) converter and a high-voltage battery;
   sensing, by a current sensor, an inductor current flowing through an inductor in a boost circuit at a front end of the DC-DC converter; and
   varying, by a controller, a gain of an output voltage controller of the DC-DC converter based on a difference of the sensed inductor current with respect to an inductor current at a center point in a specified region,
   wherein varying the gain of the output voltage controller of the DC-DC converter includes determining, by the controller, a discontinuity of the inductor current based on the difference between the inductor current at the center point in the specified region and the sensed inductor current.

2. The method according to claim 1, wherein an output side of the DC-DC converter is connected to a load terminal, and sensing the inductor current includes sensing, by the current sensor, the inductor current that is variable as the load terminal varies.

3. The method according to claim 1, wherein the inductor current at the center point in the specified region is calculated based on the sensed output voltage of the high-voltage battery and inductance of the inductor.

4. The method according to claim 1, wherein the specified region is an active or a dormant region.

5. The method according to claim 1, wherein varying the gain of the output voltage controller of the DC-DC converter includes:
increasing, by the controller, the gain in proportion to the difference between the inductor current at the center point in the specified region and the sensed inductor current.

6. The method according to claim 1, wherein varying the gain of the output voltage controller of the DC-DC converter includes:
varying, by the controller, the gain according to a preset map based on a difference between the inductor current at the center point in the specified region and the sensed inductor current.

7. The method according to claim 1, wherein, in response to determining that the inductor current is discontinuous, the gain of the output voltage controller of the DC-DC converter is varied.

8. The method according to claim 7, further comprising:
determining, by the controller, whether the inductor current becomes continuous as the gain is varied, and when the inductor current is determined to be continuous, interrupting, by the controller, the varying of the gain.

9. An output voltage control apparatus, comprising:
a plurality of voltage sensors configured to sense output voltages of a direct current-direct current (DC-DC) converter and a high-voltage battery;
a boost circuit disposed at a front end of the DC-DC converter and configured to boost an input voltage of the DC-DC converter;
a current sensor configured to sense an inductor current flowing through an inductor in the boost circuit; and
an output voltage controller of the DC-DC converter configured to vary a gain based on a difference of the sensed inductor current with respect to an inductor current at a center point in a specified region,
wherein the output voltage controller determines a discontinuity of the inductor current based on the difference between the inductor current at the center point in the specified region and the sensed inductor current.

* * * * *